United States Patent [19]

Farrar

[11] 4,250,270
[45] Feb. 10, 1981

[54] SOLUTION POLYMERIZATION WITH MOLECULAR SIEVE PURIFICATION OF RECYCLED SOLVENT

[75] Inventor: Ralph C. Farrar, Bartlesville, Okla.

[73] Assignee: Phillips Petroleum Company, Bartlesville, Okla.

[21] Appl. No.: 81,949

[22] Filed: Oct. 4, 1979

[51] Int. Cl.³ .............................................. C08F 2/06
[52] U.S. Cl. ...................................... 525/54; 526/70; 528/482
[58] Field of Search .......................... 528/482; 526/70; 525/54

[56] References Cited

U.S. PATENT DOCUMENTS

| | | | |
|---|---|---|---|
| 3,078,254 | 2/1963 | Zelinski et al. | 525/292 |
| 3,281,383 | 10/1966 | Zelinski et al. | 525/92 |
| 3,383,430 | 5/1968 | Hutson, Jr. et al. | 260/674 |
| 3,393,182 | 7/1968 | Trepka | 525/343 |
| 3,402,996 | 9/1968 | Maher et al. | 23/112 |
| 3,639,517 | 2/1972 | Kitchen et al. | 525/122 |
| 3,639,521 | 2/1972 | Hsieh | 525/314 |
| 3,725,377 | 4/1973 | Cottle | 526/70 |
| 3,862,900 | 1/1975 | Reusser | 208/262 |
| 4,086,298 | 4/1978 | Fahbach et al. | 525/130 |

OTHER PUBLICATIONS

Advances in Petroleum Chemistry and Refining, 4, pp. 115, 116, 161 (1961).

*Primary Examiner*—Stanford M. Levin

[57] ABSTRACT

In the solution polymerization process wherein monomers comprising at least one conjugated diene are polymerized followed by coupling with a polyfunctional coupling agent which results in some alkyl chloride formation and solvent recovered from said polymerization is used in a subsequent solution polymerization process, the improvement comprising contacting said solvent with a molecular sieve to remove alkyl chloride therefrom before said solvent is used in said subsequent polymerization.

20 Claims, No Drawings

SOLUTION POLYMERIZATION WITH MOLECULAR SIEVE PURIFICATION OF RECYCLED SOLVENT

MOLECULAR SIEVE PURIFICATION OF RECYCLED SOLVENT

This invention relates to preparing conjugated diene polymers by solution polymerization. In another aspect, this invention relates to solution polymerization processes wherein the solvent from one solution polymerization is used in preparing conjugated diene polymers in a subsequent solution polymerization.

The production of conjugated diene polymers by solution polymerization is well known in the art. Some examples of such processes are disclosed in U.S. Pat. Nos. 3,078,254; 3,281,383; 3,393,182; 3,639,521; 3,639,517; and 4,086,298, the disclosures of which are incorporated herein by reference. Typically, the polymerization process involves polymerizing monomers comprising at least one conjugated diene in a solvent in the presence of a suitable organoalkali metal initiator.

In commercial operations, it has proven advantageous to recover the solvent from previous polymerizations for reuse in subsequent polymerizations. The present applicant has observed that the reuse of the solvent which was obtained from certain solution polymerizations which employ polyfunctional coupling agents can result in undesirable variations in the properties of the polymers produced in subsequent solution polymerizations. The present invention is based upon the applicant's discovery that the variations in the subsequently produced polymers are due to alkyl chlorides that are formed as a byproduct of the coupling step in the preceding polymerization process.

Accordingly, an object of the present invention is to provide an improvement in the quality of polymers that are produced when using previously used polymerization solvent. Still another object is to remove a process variable which can cause variations in the quality of polymer product. Other objects, advantages, and features of this invention will be apparent to those skilled in the art from the following discussion.

The present invention thus represents an improvement in the solution polymerization process wherein (1) monomers comprising at least one conjugated diene are polymerized in a first polymerization in a solvent in the presence of an organoalkali metal initiator followed by coupling with a polyfunctional coupling agent which results in alkyl chloride formation; and (2) solvent is recovered and used in a subsequent solution polymerization process wherein monomers selected from the group consisting of conjugated dienes and vinyl-substituted aromatic compounds are polymerized in the presence of an organoalkali metal initiator. The improvement comprises contacting the solvent from the first polymerization with a molecular sieve to remove alkyl chloride from the solvent prior to the use of the solvent in the subsequent polymerization.

The present invention is applicable to any of the prior art polymerization processes wherein the coupling step results in the formation of alkyl chlorides. Although, the mechanism is not totally understood, it is believed that the alkyl chlorides form as a result of interaction between chloride in the coupling agent and alpha-olefins or possibly residual monomer in the polymerization mixture.

The subsequent polymerization can be the same as or different than the first polymerization. It is not necessary that subsequent polymerization be one employing a polyfunctional coupling agent. The extent to which the alkyl chlorides affect the properties of the polymers in the subsequent polymerization can vary depending upon the particular type of polymer being produced in that polymerization.

The monomers employed in the polymerizations can be any of those recognized as suitable in the prior art. The conjugated diene monomers generally contain 4 to 12 carbon atoms per molecule and preferably 4 to 8 carbon atoms per molecule. Examples of such compounds include 1,3-butadiene, isoprene, 2,3-dimethyl-1,3-butadiene, piperylene, 3-butyl-1,3-octadiene, 2-phenyl-1,3-butadiene, and the like. Other comonomers such as vinyl-substituted aromatic compounds can be employed with the conjugated diene monomers. Vinyl-substituted aromatic compounds generally contain 8 to 18 carbon atoms per molecule. Examples of such compounds include styrene, 3-methylstyrene, 4-n-propylstyrene, 4-cyclohexylstyrene, 4-dodecylstyrene, 2-ethyl-4-benzylstyrene, 4-ptolylstyrene, 4-(4-phenyl-n-butyl)styrene, 1-vinylnaphthalene, 2-vinylnaphthalene, and the like. The vinyl-substituted aromatic compounds can contain alkyl, cycloalkyl, and aryl substituents, and combinations thereof such as alkaryl in which the total number of carbon atoms in the combined substituents is generally not greater than 12. The conjugated dienes can be polymerized alone or in admixture with vinyl-substituted aromatic compounds to form any of the homopolymers, random copolymers or block copolymers known in the art. Monomers which are currently preferred are butadiene, isoprene, and styrene.

The term block copolymers as used herein is intended to include both linear and branched copolymers. Included within the term block copolymer are the polymers of the formulas A-B and $(A-B)_xY$, wherein A and B denote different polymer blocks, Y is an atom or group of atoms derived from a polyfunctional coupling agent and x represents the number of functional groups of the coupling agent and is an integer of at least 2. Block polymers in which x is 3 or greater are branched block copolymers. The term teleblock polymers is used herein to denote those block polymers which have identical block portions on opposite ends of the polymers.

The polymers of the above-listed compounds are prepared by contacting the monomer or monomers which it is desired to polymerize with an organoalkali metal compound, including mono and polyalkali metal compounds in the presence of a hydrocarbon diluent. The organoalkali metal compounds preferably contain from 1 to 4 alkali metal atoms per molecule. While organometallic compounds of any of the alkali metals can be employed, organolithium compounds are preferred. The alkali metals include lithium, sodium, potassium, rubidium, and cesium.

The preferred class of organolithium initiators are those of the formula RLi wherein R is a hydrocarbon radical selected from the group consisting of aliphatic, cycloaliphatic, and aromatic radicals containing from 1 to 20 carbon atoms, although higher molecular weight initiators can be used. Examples of such initiators include methyllithium, n-butyllithium, n-decyllithium, phenyllithium, naphthyllithium, p-tolyllithium, cyclohexyl lithium, eicosyllithium, and the like.

The polymerization reactions can be conducted under any suitable polymerization conditions. Generally, the temperature is in the range between −100° and +175° C., preferably −75° and +125° C. The polymerization can be conducted under autogenous pressure. It is usually desirable to operate at pressures sufficient to maintain the polymerization recipe ingredients substantially in the liquid phase.

Any suitable solvents can be employed in the polymerizations. Typically, the solvents are hydrocarbons selected from aromatics, paraffins, cycloparaffins, and mixtures thereof, containing 4 to 10 carbon atoms per molecule. Examples include isobutane, n-pentane, cyclohexane, benzene, toluene, xylene, naphthalene, and the like.

Non-limiting examples of polyfunctional coupling agents which can result in the formation of alkyl chlorides during the coupling step include silicon tetrachloride and tin tetrachloride, especially where those coupling agents are employed in excess of the stoichiometric polymer-lithium present, as for example in those polymerization processes in which maximum coupling is desired.

The solvent that is to be contacted with the molecular sieve material can be recovered in any suitable manner. Typically, it is obtained as the overhead from the flashing of the polymer cement resulting from the polymerization. Preferably, the solvent that is contacted with the molecular sieve is substantially free of water, i.e., containing no more than about 10 ppm of water, preferably no more than 5 ppm.

In the practice of this invention any molecular sieve material can be employed that is effective in removing alkyl chlorides from the solvent. Applicable materials are the crystalline alumino-silicates which have been heated to remove water of hydration. The adsorbent materials may be prepared by any of the well known methods in the art. Of the three classes of crystalline zeolites, fibrous, laminar, and rigid three-dimensional anionic networks, the last mentioned class only is suitable in this invention. Examples of such materials include chabazite, phacolite, gmelinite, harmotone, and the like, or suitable modifications thereof, produced by base exchange. The literature contains many references to the composition and adsorbing action of molecular sieves. Generally speaking, molecular sieves are alkali metal or alkaline earth metal alumino-silicates and can be either natural or synthetic in origin. Said materials have large numbers of submicroscopic cavities interconnected by many smaller pores or channels which are extremely uniform in size. In operation, the generally accepted explanation for the action of the molecular sieves is that adsorption takes place within said pores, and only those materials having molecular diameters small enough to enter said pores are retained by the zeolite. Hence, the name molecular sieves. Generally, the molecular sieves applicable in the present invention are those having pore diameters in the range of about 4 to about 11 angstrom units. The 4A, 10X, and 13X type molecular sieves available from Linde Company have pore diameters in that range. The currently preferred molecular sieve is the Linde 13X type molecular sieve.

The molecular sieve materials can be employed in granular form, such as 1/16 to ¼ inch pellets, or in finely divided form, such as about 200 mesh. The contacting of the dry solvent with the molecular sieve materials can be carried out in any suitable zone, such as a fixed bed, moving bed, or the like.

The conditions employed for contacting the dry solvent with the molecular sieve materials can vary depending upon the concentration of alkyl chloride, the desired degree of removal of alkyl chloride, and other factors that will be readily apparent to those skilled in the use of molecular sieves. The temperature of contacting will generally be in the range of about 70° to about 200° F., preferably about 70° to about 150° F., and more preferably about 80° to about 100° F. The contacting pressure is not critical and generally will be within the range of from atmospheric to about 600 psig. Generally, it is preferred to employ a pressure sufficient to maintain the solvent in the liquid phase and sufficient to provide for normal pressure drops through the bed when a fixed bed is employed. Generally, the contacting can be carried out at liquid space velocities within the range of from 0.5 to 10.0, preferably 0.8 to 1.2 volumes of solvent per volume of molecular sieve per hour.

The molecular sieve adsorbent materials employed in the practice of the invention can be regenerated in any suitable manner such as by heating, and/or contacting with a suitable gas, for example, hydrogen. The hydrogen employed in many instances can conveniently be obtained from a catalytic reforming unit. Regeneration temperatures within the range of from about 200° to about 600° F., preferably 300° to 450° F., can be utilized. Said regeneration can be carried out at any suitable pressure. However, when a gas such as hydrogen from a catalytic reforming unit is employed as the regeneration medium it is generally preferred to carry out the regeneration at approximately the same system pressure employed in the catalytic reforming operation, for example, within the range of from about 400 to about 1000 psig. It is also within the scope of the invention to employ suitable liquid regeneration medium. Another method which can be employed involves evacuation of the contacting vessel. Still another method is to pass air or other oxygen-containing gas preheated to a temperature within the range of about 500° to 800° F. so as to burn off the adsorbed materials under controlled conditions.

The objects and advantages of the present invention can be further illustrated by the following examples.

EXAMPLE 1

In a commercial operation for producing a 52/48 weight ratio 1,3-butadiene/styrene branched teleblock copolymer by solution polymerization and a subsequent coupling step, the solvent comprising cyclohexane from each polymerization step was recovered under conditions which minimized solvent loss. The recovered solvent was then reused in subsequent polymerizations producing additional amounts of the same copolymer. The copolymers produced in the later polymerizations had lower Shore A hardness and higher micrometer deflection properties. Also, the molecular weight distribution in the polymers produced using recovered solvent was different from those produced using fresh solvent.

Polymerization tests of initiator, monomers, solvent, and coupling agent demonstrated that the problem was due to an impurity in the recycle solvent. Numerous gas chromatographic analyses were made on the recycle solvent. None of the analyses revealed the presence of anything which was thought likely to cause the variations noted. Only those hydrocarbons normally expected in the recycle solvent were noted.

The coupling agent used in making this branched teleblock copolymer was silicon tetrachloride.

The recycle solvent was fractionated into 13 fractions and the chloride content of each fraction was determined. The presence of chloride in at least the lighter fractions was confirmed, but the concentration of chloride in the unfractionated recycle solvent was less than the detectable limit of 10 mg/kg.

Certain of the fractions of recycle solvent were employed in laboratory polymerizations. The only fractions that produced polymers having the unusual molecular weight distribution were the two having chloride content of at least 23 mg/kg.

A more detailed study of certain of the fractions using gas chromatography and mass spectrometry revealed the presence of tertiary-butyl chloride. The presence was not detected using only gas chromatography because the tertiary-butyl chloride peak was overshadowed by a pentene peak.

In order to determine whether the tertiary butyl chloride was the component causing the undesired variations, a series of laboratory polymerizations were carried out using laboratory cyclohexane containing various levels of tertiary-butyl chloride. The addition of tertiary-butyl chloride to the solvent in amounts of 25 and 100 mg/kg resulted in polymers having variations in molecular weight distribution analogous to those observed in the commercial polymers prepared using recycled solvent.

EXAMPLE II

In order to obtain a more accurate determination of the amount of alkyl chlorides in the recycle solvent analysis was conducted using a Tracor 560 gas chromatograph equipped with a Hall 700A electrolytic conductivity detector. The adsorbents and electrolytes were selected so that the Hall detector would not respond to non-halogen containing compounds. This technique allowed for the recognition of alkyl chlorides in amounts as low as 0.1 mg/kg. Alkyl chlorides noted in this manner included tertiary-butyl chloride, tertiary-amyl chloride, isopropyl chloride, and 2-chlorobutane, with tertiary-butyl chloride being the major alkyl chloride at a level of about 42.5 mg/kg.

EXAMPLE III

Significant levels of tertiary-butyl chloride were also noted in the recycle solvent from polymerizations producing 70/30 and 60/40 weight ratio 1,3-butadiene/styrene branched teleblock copolymers. Both of these copolymers are formed using silicon tetrachloride as a coupling agent. As in the production of the 52/48 1,3-butadiene/styrene copolymers as described in Example I, the coupling agent in these processes is used in excess of the stoichiometric amount to assure maximum branching. The use of the chloride-containing recycle solvent in the respective polymerization processes produced variations in the hardness and stiffness of the polymers analogous to that observed in the production of the 52/48 1,3-butadiene/styrene copolymer in Example I.

EXAMPLE IV

Significant levels of tertiary-butyl chloride were also noted in the recycle solvent from a polymerization producing a 75/25 weight ratio 1,3-butadiene/styrene random copolymer which is coupled with tin tetrachloride. The solvent from that polymerization was used in a process for producing a 52/48 weight ratio 1,3-butadiene/styrene linear random tapered block copolymer. The latter polymer is produced using a fatty acid shortstopping agent rather than a tin or silicon chloride coupling agent. The use of the chloride-containing solvent resulted in a major modification of the 52/48 1,3-butadiene/styrene linear, tapered block copolymer structure. Instead of obtaining a linear, random tapered block copolymer having a butadiene/styrene random tapered block at one end and a styrene block at the other end, there was obtained a polymer having significant amounts of butadiene/styrene random tapered blocks at each end, i.e., a polymer having a polystyrene center block and two rubbery butadiene/styrene random tapered copolymer end blocks.

EXAMPLE V

A series of adsorbent materials were evaluated to determine their effectiveness for removing tertiary-butyl chloride from cyclohexane containing 50 mg/kg of tertiary-butyl chloride. A 100 cc bed and solvent flow rate of 100 ml/hour were used. The results of this evaluation are summarized in Table I.

TABLE I

| Adsorbent | Tertiary-Butyl Chloride in Bed Effluent |
| --- | --- |
| Alcoa H-151 alumina | 22 |
| Silica gel | 14 |
| Magnesium oxide | 6 |
| 4A Molecular sieve | 1.2 |
| 13X Molecular sieve | <0.5 |

Alumina was not particularly effective, silica gel provided some improvement, but the most effective materials by far were the molecular sieves. While the magnesium oxide was somewhat effective, those results were only obtained with the expensive powder form of magnesium oxide. When magnesium oxide was heated and pressed into pellets, it was no longer effective.

EXAMPLE VI

Using the 13X type molecular sieve, bed life experiments were conducted to determine whether the adsorbent would be suitable for use in a commercial operation. The study was conducted at flow rates consistent with the use of two 1068 liter adsorbent beds. The residence time was calculated to be 5.1 minutes per column or 10.2 minutes for the two beds operated in series. The solvent employed was 98% purity polymerization grade cyclohexane. Dry solvent was prepared by countercurrent nitrogen purging in a column packed with Berl saddles. The solvent contained about 50 mg/kg of tertiary-butyl chloride and about 100 mg/kg of tetrahydrofuran.

TABLE II

| Tertiary-Butyl Chloride in Bed Effluent | | | | | |
| --- | --- | --- | --- | --- | --- |
| Wet Solvent[a] | | Dry Solvent[b] | | Dry Solvent[c] | |
| Hours | mg/kg | Hours | mg/kg | Hours | mg/kg |
| 549 | 14 | 474 | 1.9 | 409 | 0.5 |
| 574 | 13 | 499 | 2.6 | 620 | 1.2 |
| 607 | 12 | 742 | 2.7 | 830 | 3.1 |
| 703 | 22 | 895 | 5.0 | 1388 | 6.1 |
| | | 1802 | 8.5 | 1702 | 8.8 |

[a]Solvent contained about 100 ppm water.
[b]Saturated with THF at about 170 hours.
[c]Bed saturated with THF at start.

The results indicate that use of wet solvent was detrimental to bed life. The beds were considered to be sufficiently effective to justify use on dry solvent whether or not the solvent contained THF. The water content of the mole sieves and tertiary-butyl content of the solvent will affect the bed life.

As will be evident to those skilled in the art, various modifications of this invention can be made or followed in light of this disclosure without departing from the spirit and scope thereof.

What is claimed is:

1. In the solution polymerization process wherein (1) monomers comprising at least one conjugated diene are polymerized in a first polymerization in a solvent in the presence of an organoalkali metal initiator followed by coupling with a polyfunctional coupling agent which results in some alkyl chloride formation, and (2) solvent is recovered from said first polymerization and used in a subsequent solution polymerization process wherein monomers selected from the group consisting of conjugated dienes and vinyl-substituted aromatic compounds are polymerized in the presence of an organoalkali metal initiator, the improvement comprising contacting said solvent from said first polymerization with a molecular sieve to remove alkyl chloride therefrom before said solvent is used in said subsequent solution polymerization process.

2. A process according to claim 1 wherein said molecular sieve has an effective pore size in the range of about 4 to about 11 angstrom units.

3. A process according to claim 2 wherein said polyfunctional coupling agent is tin tetrachloride or silicon tetrachloride.

4. A process according to claim 3 wherein said molecular sieve is an X type molecular sieve.

5. A process according to claim 4 wherein said molecular sieve has a formula of $Na_{86}[(AlO_2)_{86}(SiO_2)].276H_2O$.

6. A process according to claim 2 wherein the coupling following said first polymerization results in a branched block copolymer of the formula $$(A-B)_xY$$

Wherein A represents a block of one monomer and B represents a block of another monomer, Y is an atom or group of atoms derived from the polyfunctional coupling agent, and x is an integer of greater than 3 representing the number of functional groups of the coupling agent that attach Y to the A-B segments of the polymer.

7. A process according to claim 6 wherein A represents a non-elastomeric block formed from vinyl-substituted aromatic compounds, and B represents an elastomeric block formed from conjugated dienes.

8. A process according to claim 7 wherein said molecular sieve is an X type molecular sieve.

9. A process according to claim 8 wherein said molecular sieve has a formula of $Na_{86}[(AlO_2)_{86}(SiO_2)_{106}].276H_2O$.

10. A process according to claim 9 wherein said coupling agent is silicon tetrachloride and said initiator is n-butyllithium.

11. A process according to claim 10 wherein said subsequent polymerization is directed toward making the same polymer as that made in said first polymerization.

12. A process according to claim 11 wherein said solvent comprises cyclohexane.

13. A process according to claim 12 wherein A represents a block prepared from styrene and B represents a block from 1,3-butadiene.

14. A process according to claim 13 wherein the weight ratio of 1,3-butadiene monomer to styrene monomer in the range of about 70/30 to about 52/48.

15. A process according to claim 2 wherein said first polymerization results in the formation of a random copolymer.

16. A process according to claim 15 wherein said monomers in said first polymerization are 1,3-butadiene and styrene.

17. A process according to claim 16 wherein said coupling agent is tin tetrachloride and said initiator is n-butyllithium.

18. A process according to claim 17 wherein said subsequent polymerization is directed toward making the same polymer as that made in said first polymerization.

19. A process according to claim 18 wherein said solvent comprises cyclohexane.

20. A process according to claim 19 wherein the weight ratio of 1,3-butadiene monomer to styrene monomer is about 75/25.

* * * * *

UNITED STATES PATENT AND TRADEMARK OFFICE
CERTIFICATE OF CORRECTION

PATENT NO. : 4,250,270
DATED : February 10, 1981
INVENTOR(S) : Ralph C. Farrar

It is certified that error appears in the above-identified patent and that said Letters Patent are hereby corrected as shown below:

Column 7, line 34, delete "$Na_{86}[(AlO_2)_{86}(SiO_2)].276-$" and insert therefor --- $Na_{86}[(AlO_2)_{86}(SiO_2)_{106}].276-$ ---

Column 7, line 41, delete "Wherein" and substitute therefor --- wherein ---.

Signed and Sealed this

Twenty-eighth Day of April 1981

[SEAL]

Attest:

RENE D. TEGTMEYER

Attesting Officer

Acting Commissioner of Patents and Trademarks